INVENTORS
Charles Livoti
George L. Hurst
BY Boyken, Mohler & Beckley
ATTORNEYS

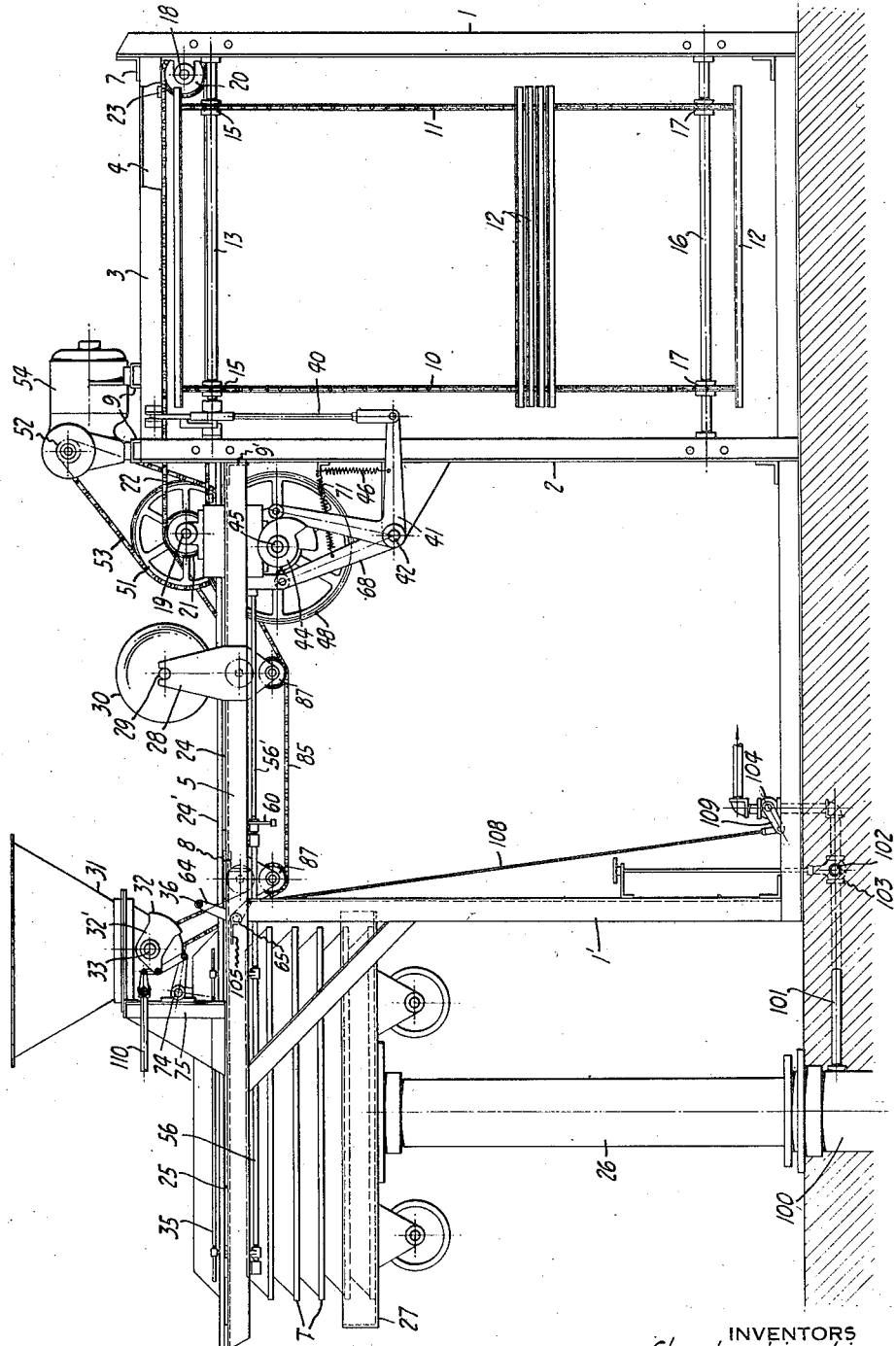

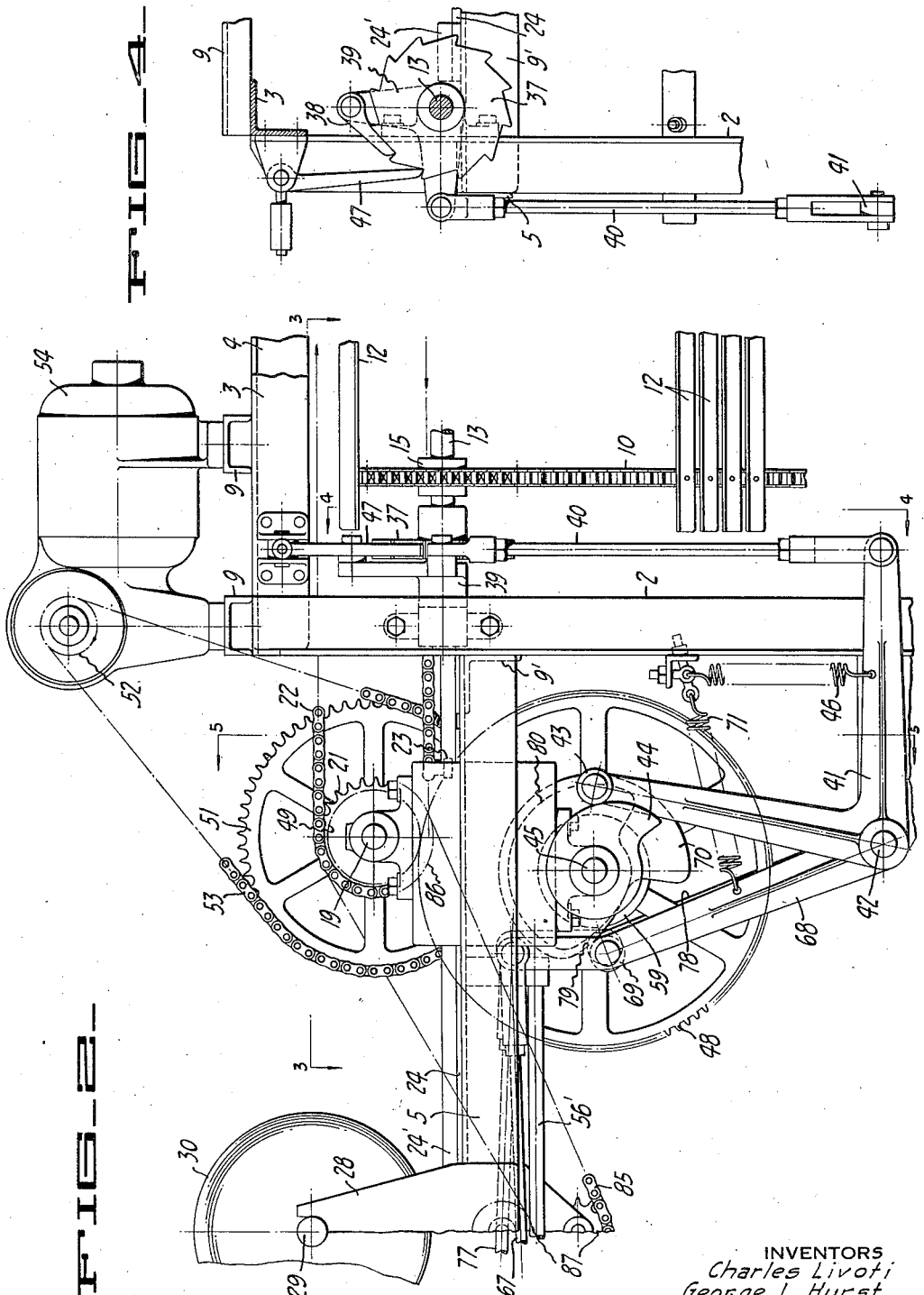

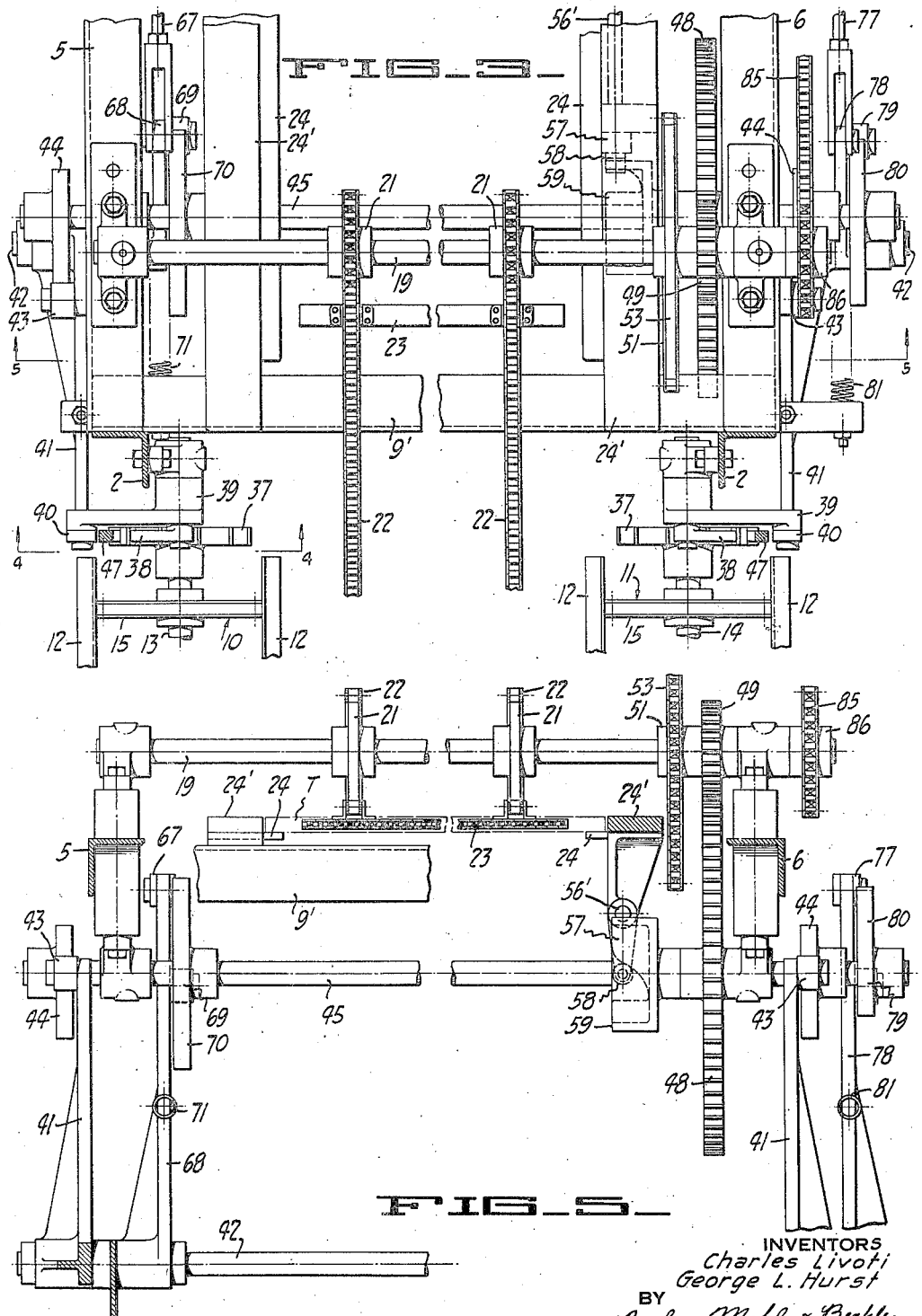

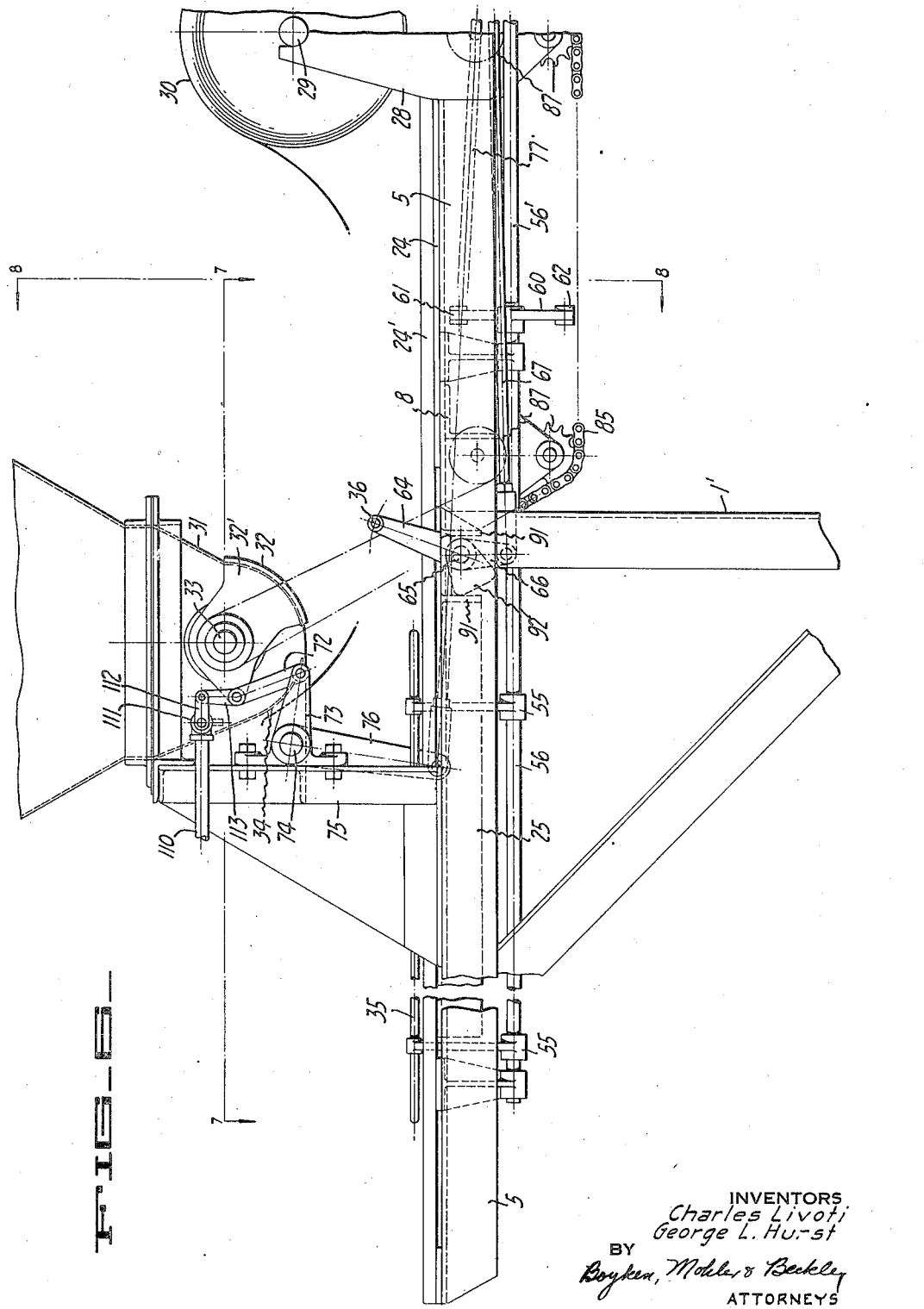

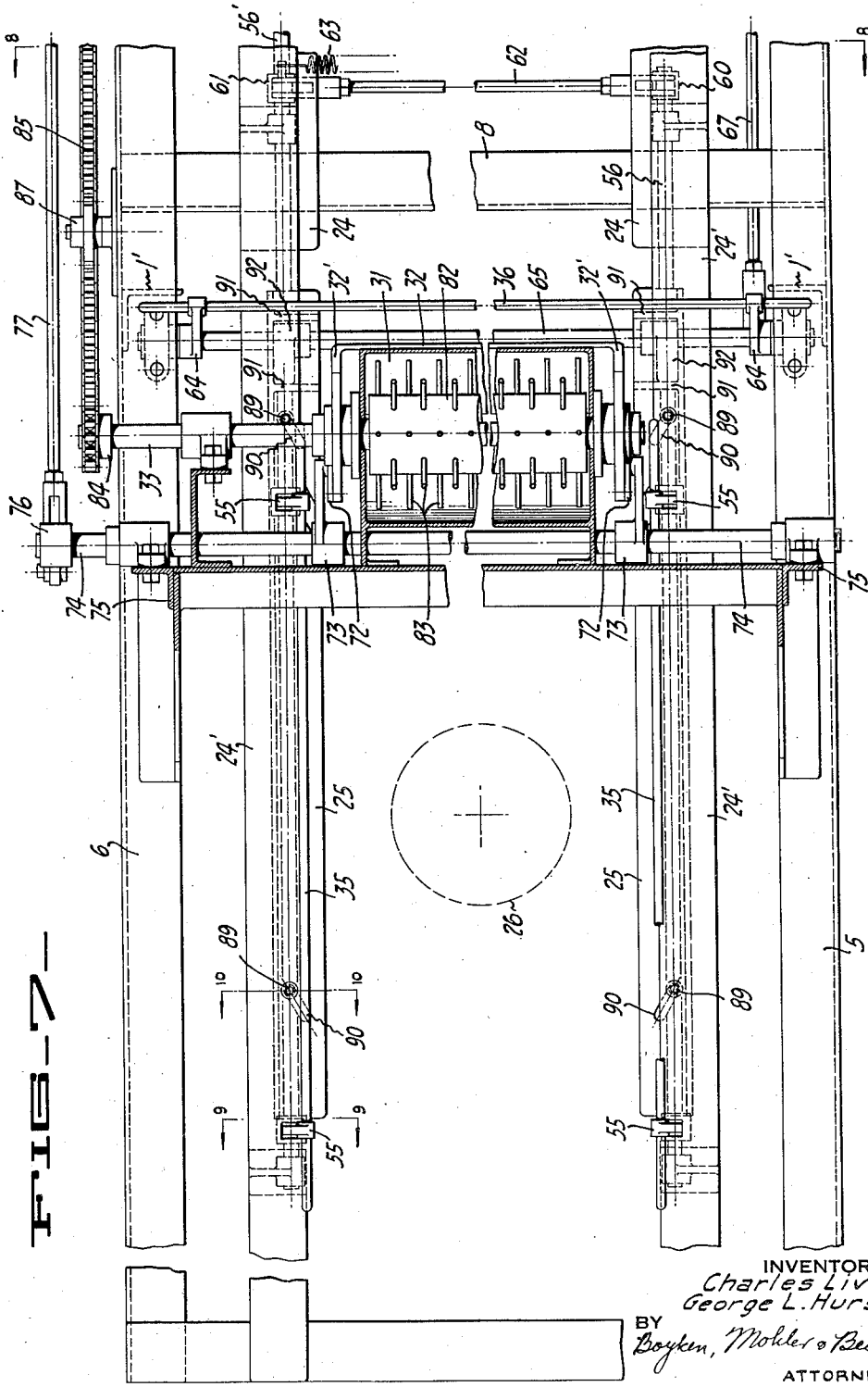

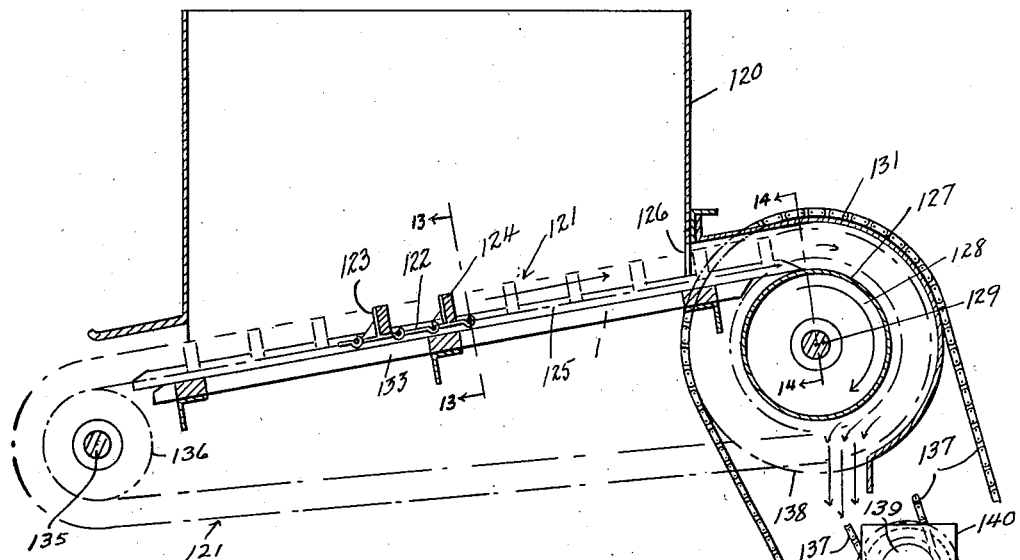
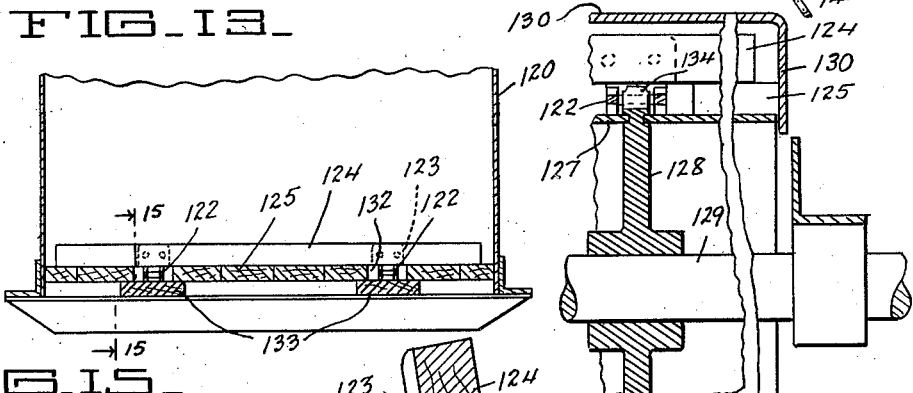
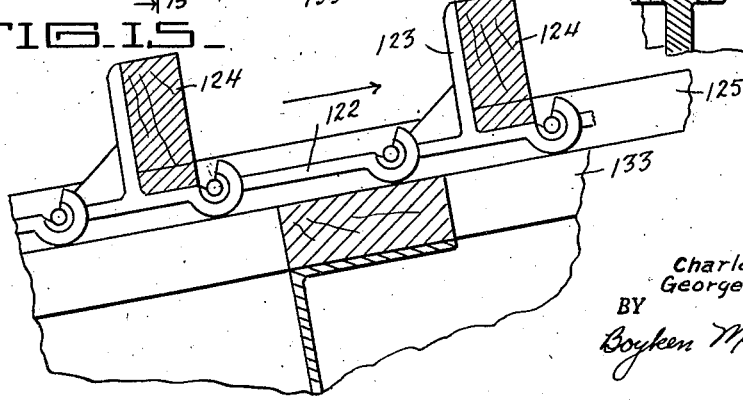
INVENTOR.
Charles Livoti
George L. Hurst
BY Boyken Mohler & Beckley Patented Oct. 24, 1944

2,361,219

UNITED STATES PATENT OFFICE 2,361,219

LOADER AND METHOD OF HANDLING TRAYS, INCLUDING THE LOADING THEREOF WITH OLIVE PULP FOR PRESSING

Charles Livoti, Roseville, and George L. Hurst, San Francisco, Calif.; said Hurst assignor to said Livoti Application August 11, 1942, Serial No. 454,466

12 Claims. (Cl. 100—51)

This invention relates to an improved loader and to a method of handling trays including the loading thereof with olive pulp for pressing to remove the oil from said pulp.

One of the objects of this invention is an improved loader for conveying trays or racks from a first station to a second station, and which loader includes means for positioning a filter cloth on each tray at a point between said stations and for depositing a substantially uniform layer of material, such as olive pulp, on the filter cloth so positioned, and for folding the margins of such cloth over such layer, and finally stacking the loaded trays at said second station for subsequent pressing of the material in the stack.

Another object of the invention is an improved loader provided with means for carrying a row of trays along a substantially horizontal path of travel and which loader includes means for automatically folding the projecting margins of filter cloth on each tray over the material deposited on such cloth at a point in said path of travel.

A still further object is an improved method of loading trays with olive pulp including the lining of the trays with filter cloth and the folding of margins of the filter cloth over the pulp on said cloth, and which method includes the steps of automatically removing empty, unlined trays in succession from a magazine, carrying the trays so removed in a row along a generally horizontal path of travel, and stacking the loaded and lined trays at the end of said path with the lining, loading, and folding of said lining over material thereon, being accomplished during the travel of the trays from the magazine to the finally formed stack of loaded trays.

Other objects and advantages will appear in the specification and claims.

Briefly described, heretofore the method of handling olive pulp for expressing the oil therefrom has been to manually line each tray with a filter cloth, such as relatively heavy burlap. The trays have then been manually loaded with pulp, and the pulp then manually spread over the cloth. The trays so loaded have then been manually carried to the presses and stacked for pressing in the latter. This method is laborious, slow, and costly, requiring a considerable number of workmen, and space in which to carry on the work. Also there is inevitable waste of materials and lack of uniformity in the materials both as to their physical characteristics and as to the volume in each stack of trays being pressed, and as to the volume and distribution of material on each tray.

By the invention hereinafter described, an orderly, continuous loading of trays with a uniform volume of material on each tray is rapidly accomplished with a minimum of labor, and practically all steps are automatically effected from the time the empty trays are positioned at one station for loading until the trays, properly lined and loaded, are ready for the presses.

In the drawings, Fig. 1 is a side elevational view of the apparatus employed.

Fig. 2 is an enlarged fragmentary elevational view of a portion of the apparatus intermediate the opposite ends thereof.

Fig. 3 is a fragmentary plan view of the main cam shaft and sprocket shaft and other elements of the portion shown in elevation in Fig. 2.

Fig. 4 is an enlarged sectional view taken along the line 4—4 of Fig. 3.

Fig. 5 is an enlarged sectional view taken along line 5—5 of Fig. 3.

Fig. 6 is an enlarged elevational view of one end of the apparatus as seen from the same side as Fig. 2, the said end portion being broken in length.

Fig. 7 is a plan view of the portion shown in elevation in Fig. 6.

Fig. 12 is a semi-diagrammatic view partly in section, of another form of feed device for the olive pulp than is shown in preceding figures.

Fig. 13 is a sectional view taken along line 13—13 of Fig. 12.

Fig. 14 is an enlarged fragmentary sectional view taken along line 14—14 of Fig. 12, showing one end of the conveyor drum at the discharge end of the feeder.

Fig. 15 is an enlarged fragmentary sectional view as seen along line 15—15 of Fig. 13.

Figure 8:
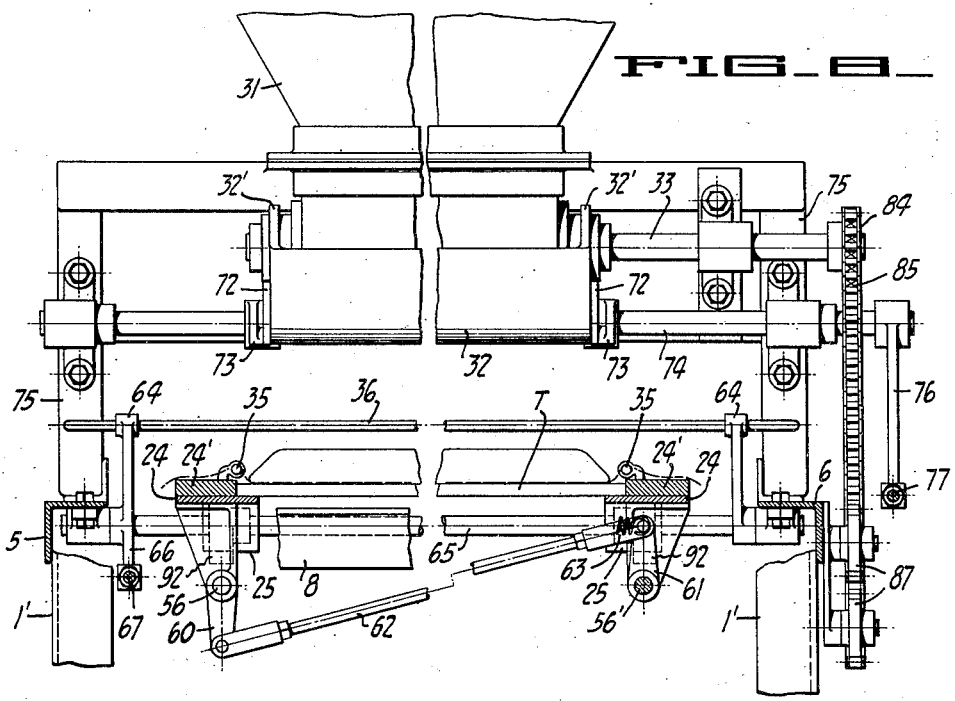
Fig. 8 is a sectional view taken along line 8—8 of Fig. 7.

The above drawings and the description are to be considered as being illustrative of the invention, and not restrictive, since it is obvious that variations may be made in the structure without departing from the invention.

In detail, the apparatus illustrated in the drawings comprises a generally rectangular, horizontally disposed, elongated frame supported at one of its ends on corner posts 1 and at its opposite end on corner posts 1'. Intermediate the ends of the frame is a pair of supporting posts 2. The frame itself comprises side frame members 3, 4 extending between the upper ends of posts 1, 2, and side frame members 5, 6 extending between the upper ends of posts 1', 2. End frame member 7 extends between posts 1 and end frame member 8 extends between posts 1'. Cross frame members 9, 9' parallel with the end members extend between side frame members 3, 4 and 5, 6 adjacent posts 2.

The rectangular space defined at its corners by posts 1, 2 is the space within which vertically extending endless conveyors 10, 11 are disposed below side frame members 3, 4 respectively. These conveyors may each comprise an endless chain supporting equally spaced, horizontally extending, angle strips 12 thereon for supporting horizontal trays thereon between adjacent, vertically extending runs of the conveyors. Several of these angle strips are indicated in Figs. 1, 2, it being understood that the strips are equally spaced along the pairs of chains, respectively positioned at opposite sides of the one end of the loader frame.

The trays T may be quickly slipped horizontally onto any two opposed angle strips from the end of the loader adjacent posts 1.

A pair of parallel, horizontal shafts 13, 14 each carrying a pair of sprockets 15 support the upper ends of the conveyors, while a pair of shafts 16 below shafts 13, 14 carry sprockets 17 thereon over which latter sprockets the chains carrying strips 12 extend.

The conveyors as above described constitute a magazine for spaced, superposed, horizontally disposed empty trays. As will be later described, said conveyors are intermittently actuated to raise the trays to a predetermined level near the upper ends of the conveyors for successive removal from the conveyors.

Over the upper end of the magazine, just described, is a tray pusher device for pushing the uppermost tray in the magazine horizontally off the angle strips 12 in direction toward the opposite end of the loader.

This tray pusher comprises a pair of parallel shafts 18, 19 (Fig. 1) extending at right angles to shafts 13, 14 and at a level above the level of the latter. Shaft 18 is rotatably supported adjacent its ends in bearings carried by the loader frame and is positioned adjacent the upper ends of posts 1, while shaft 19 is similarly supported adjacent the upper ends of posts 2, but between posts 2 and posts 1'.

On shaft 18 is secured a pair of sprockets 20, and a similar pair of sprockets 21 are secured on shaft 19. Endless chains 22 extend over corresponding pairs of sprockets on shafts 18, 19, and extending parallel with said chains are uniformly spaced pusher bars 23.

The lower runs of chains 22 are positioned between the adjacent runs of conveyors 10, 11 and are arranged in a manner so that rotation of the shafts 18, 19 in a direction to move the said lower runs away from the adjacent ends of the loader frame will cause the bars 23 that successively pass around shaft 18 to engage one end of the uppermost tray in the magazine, and will push such tray longitudinally of angle strips 12 completely off the latter and onto parallel tracks 24 extending in longitudinal extension of the strips from which the uppermost tray is so moved.

The tracks 24 are supported in any suitable manner on the loader frame, such as on cross frame members extending between the side frame members 5, 6.

In longitudinal extension of tracks 24, opposite the ends of the latter that are adjacent the magazine, are track sections 25. These sections 25 are adapted to support the most advanced tray moved from strips 12, and are supported below stationary strips 24' that extend the full lengths of tracks 24, 25. Said strips 24' function as edge-guides for the trays that are pushed along the tracks, and while tracks 24 are stationary, the sections 25 are movable transversely of the strips 24' that extend over each section. When a tray is pushed onto sections 25 and said sections are moved oppositely outwardly, it is obvious that said tray will drop. Means, later described, is provided for causing movement of said sections simultaneously toward and away from each other.

Within the area below the plane of track sections 25, and below the space between said sections, is a device for supporting the trays as they are dropped from the track sections 25, and which device is adapted to be automatically lowered the thickness of each loaded tray (including the load) after each tray has been dropped from said tracks.

This device, as illustrated in the drawings, is a conventional hydraulic hoist, having a vertically reciprocable piston 26 adapted to support a flat car 27 on its upper end on which the trays dropped from track sections 25 are supported. This piston or post, with the car thereon is initially elevated to the desired height for receiving the initial tray dropped from the track sections, and after said tray is dropped, or at about the same time the said tray is dropped, the piston is automatically lowered the thickness of the tray and load thereon, so as to receive the next tray that drops from the sections 25. When the car 27 is fully loaded with a stack of loaded trays, the piston will have been lowered until the ground wheels on car 27 engage the floor or a platform, and the car with its load thereon is then wheeled away to the press.

Supported on upstanding brackets 28 extending upwardly from the loader frame at a point about midway between posts 1', 2 is a cross shaft 29 extending over tracks 24 at right angles to said tracks. This shaft carries a roll of filter cloth 30, which cloth may be in the form of burlap. This roll is made up of separate rectangular sheets of said cloth that are appreciably greater in dimensions than the size of each tray. Hence, when a sheet of the cloth is positioned on one of the trays there will be a considerable marginal portion on the cloth projecting outwardly of each edge of the tray.

Adjacent posts 1', and above the same, is a pulp feeder in the form of a horizontally elongated trough 31 that extends above and between frame members 5, 6, and above the ends of track sections 25 that are nearest the roll of cloth 30. The lower side of said trough is formed with an elongated opening extending longitudinally of the trough, which opening is normally closed by a gate 32 having arms 32' at its ends secured to the end portions of a shaft 33 that is in turn rotatably supported in bearings on the ends of the trough. This shaft is intermittently actuated to swing the gate from closed to open position as a tray moves below said trough and onto track sections 25, thus loading the tray with olive pulp or other material carried in the trough, and as soon as the tray has substantially passed said opening, the gate automatically closes, until another tray passes below the opening and onto track sections 25.

This trough 31 carries on its side remote from the roll of cloth 36, a plurality of pins 34 projecting generally longitudinally of the direction of travel of the trays. An operator, or operators, at one or opposite sides of the loader frame, pull a sheet of filter cloth from roll 30 and attach the leading edge of such cloth to said pins by impaling the cloth on said pins. The sheet of cloth so held at its leading edge on said pins extends across the discharge opening in trough 31 and on the tray about to be advanced onto track sections 25. Material discharging from said trough will fall onto said cloth, which is supported by the tray, and as the tray passes below the opening in the feed trough, the olive pulp is spread on the cloth and the leading margin of the filter cloth will automatically be drawn over the leading margin of the layer of such material and will be withdrawn from said pins to fall flat on said leading margin of the layer.

The side margins of the filter cloth that is on the tray being loaded are supported on bars 35 that are parallel with the track sections 25. These margins slide along said bars as the tray is being loaded, and the trailing margin of the filter cloth that projects from the trailing edge of the tray is supported on a transverse bar 36 under which the tray passes in moving onto track sections 25.

As soon as the tray is on track sections 25 and in a position to be dropped from said sections, and at substantially the time the tray is so dropped, the bar 36 automatically and quickly flips the trailing margin of the filter cloth over the layer of material on the tray. The tray then drops and the side bars 35 quickly swing generally toward each other, thus flipping the margins of the cloth on said bars over the side margins of the material on the trays.

The foregoing description generally identifies the manner in which the loader works without going into detail as to the various actuating elements for actuating the various parts, which are as follows.

Magazine for empty trays

The upper sprockets 15 and lower sprockets 17 supporting the upper and lower ends of the conveyors 10, 11, have been described. These conveyors are intermittently actuated simultaneously to move the opposed, adjacent, vertical runs thereof upwardly. At each movement the opposed pairs of shelves formed by the angle strips 12 on said adjacent runs are raised a distance to bring the trays on said shelves, successively, even with the adjacent ends of tracks 24.

The means for effecting this movement comprises a pair of ratchet wheels 37 respectively secured on the ends of the upper conveyor shafts 13, 14 that are adjacent posts 2.

The actuation of one of said wheels only will be described, it being understood that the same structure applies to each wheel.

A ratchet pawl 38 (Fig. 4) pivoted at one end to one arm of bell crank 39 is adapted to successively engage the teeth of the wheel 37 upon rocking the crank. Crank 39 is supported intermediate its ends for rocking on shaft 13, and the end of crank opposite pawl 38 is pivotally connected to one end of a connecting rod 40. The opposite end of rod 40 is pivotally connected to one end of a second bell crank 41, which latter crank is pivotally supported intermediate its ends for rocking on a shaft 42. Shaft 42 is supported by any suitable means on posts 2 and extends between said posts. The opposite end of crank 41 carries a cam follower 43 rotatably supported thereon, and which follower is positioned to engage the cam surface of a cam 44 secured to the main cam shaft 45. The main shaft 45 is rotatably supported in bearings carried by the side frame members 5, 6. A coil spring 46 (Fig. 2) secured at one end to one arm of crank 41 and at its opposite end to a bracket secured on post 2 functions to hold cam follower 43 against the cam surface of cam 44 at all times.

Secured to side frame member 3, (4) is a bracket pivotally supporting a locking pawl 47 that locks wheel 37 against reverse movement of the wheel after the wheel has been rotated by the movement of pawl 38.

The peripheral cam surface of cam 44 that engages the follower 43 is formed to rock crank 41 intermittently, thereby rocking crank 39 and causing the pawl 38 to rotate wheel 37.

On cam shaft 45 is secured a gear 48 in mesh with a pinion 49 on shaft 19 that carries the sprockets supporting one end of the tray pusher device. A sprocket 51 on shaft 19 is connected with a drive sprocket 52 by a chain 53. Said sprocket 52 is directly driven by a motor 54 supported on the loader frame adjacent posts 2.

From the foregoing it will be seen that the continuous driving of the main cam shaft 45 by the motor 54 will cause the conveyors 10, 11 to be intermittently actuated for successively raising the trays on said conveyors to the level of tracks 24.

Tray pusher device

This device has been already described with sufficient clarity, except for the driving means, which means constitutes the sprocket 51 and chain 53 connecting said sprocket with the motor driven sprocket 52.

The pusher bars 23 on the lower runs of chains 22 of said pusher device are at a level to successively engage the rear edges of the trays raised by conveyors 10, 11 as said trays are raised to a predetermined level in the path of travel of said bars 23. Thus the uppermost tray in the tray magazine is pushed longitudinally of the angle strips 12 onto tracks 24 and between strips 24'. Each tray so pushed onto said tracks is intermittently pushed along said tracks under roll 30 and onto track sections 25 by the next tray pushed from the magazine by one of the bars 23.

Side flip filter cloth folding bars

The bars 35, already mentioned, are normally positioned alongside a tray moved onto track sections 25. Said bars are each supported on the upper ends of a pair of generally vertically disposed arms 55 that are in turn secured at their opposite ends to shafts 56, 56'.

Figure 9:
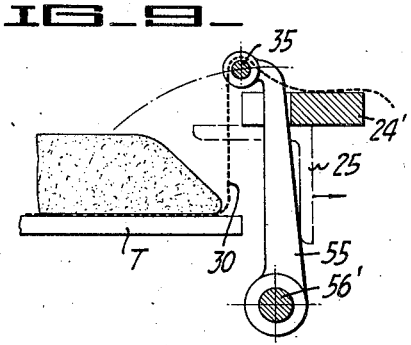
Fig. 9 is a fragmentary, semi-diagrammatic, sectional view showing one of the bars (in section) for folding the filter cloth over one of the side margins of the loaded tray, with the tray dropped to its position on a stack of previously loaded trays.

The shafts 56, 56' are parallel and are disposed adjacent side frame members 5, 6, respectively, and are supported for rotation in bearings secured to said members. (Figs. 6, 7, 9.)

Shaft 56 terminates at its end adjacent the main cam shaft 45 a considerable distance from said shaft, while shaft 56' extends almost to said shaft, and to the end of shaft 56' adjacent said shaft is secured an arm 57, a cam follower 58 engaging the cam surface being engaged by said follower facing in a direction axially relative to shaft 45. Arm 57 extends downwardly from shaft 56', therefore upon rotation of the cam 59, the arm 57 will oscillate about the axis of shaft 56' causing the shaft 56' to rotate.

The end of shaft 56 adjacent shaft 45, but, spaced a considerable distance therefrom, carries an arm 60 extending downwardly therefrom, and shaft 56' carries a similar arm 61 at a point on shaft 56' directly across from arm 60, but which arm 61 extends upwardly from shaft 56'. A connecting rod 62 is pivotally connected at its ends to the outer ends of arms 60, 61. Therefore, upon rotation of shaft 56' in one direction when arm 57 is oscillated in one direction, the side flip bars 35 will swing toward each other, and away from strips 24', whereby the projecting side margins of the filter cloth supported thereon will be thrown over the margins of the layer of pulp on the tray that is disposed between said bars, and upon reverse oscillation of arms 57, the bars 35 will be restored to their normal position.

The cam surface of cam 59 is so shaped and positioned relative to shaft 45 as to effect the movement of bars 35 toward each other after the bar 36 has folded over the trailing edge of filter cloth, and after the loaded tray has been dropped from track sections 25. Fig. 9 illustrates the position of the tray T and filter cloth 30 thereon, with the pulp supported on said cloth and tray, just before the arms 55 are swung over the pulp to fold over the side margins of the cloth.

A coil spring 63 (Fig. 7) connected at one end to the outer end of arm 61 and at its opposite end to any suitable bracket (not shown) carried by the loader frame functions to cause the cam follower 58 to engage the axially facing cam surface of cam 59 at all times.

*The means for actuating the rear folding bar 36*

The bar 36 folds over the trailing margin of the filter cloth on a tray on track sections 25 after the loading margin of the cloth is folded over, or at substantially the same time, and before the tray is dropped and the side bars 35 are actuated.

Bar 36 is supported at its ends on the outer ends of a pair of arms 64, the inner ends of which arms are secured to a cross shaft 65 that is rotatably supported in bearings carried on the loader frame. In Fig. 6 this bar is shown in about the final position it occupies when in folding over the trailing edge of filter cloth, but in its normal position it is at a lower level but above the level of tracks 24 so that trays pushed on said tracks will pass below the bar.

An arm 66 (Figs. 6, 7) projects from shaft 65 below the arm 64 that is adjacent side frame member 5 and a rod 67 pivotally connected at one end to the outer end of arm 66 extends from said arm toward cam shaft 45. The opposite end of rod 67 is pivotally secured to the upper end of an arm 68 that in turn is pivotally supported at its lower end for swinging on shaft 42, which latter shaft is the same one that supports the bell crank 41 that forms a portion of the actuating means for conveyors 10, 11.

A cam follower 69 is carried on arm 68 intermediate the opposite ends of the latter, which follower engages the cam surface of a cam 70 on the main cam shaft 45, and a coil spring 71 connected to said arm at one of its ends and to one of the posts 2 at its opposite end functions to hold cam follower 69 against the cam 70 at all times.

The contour of the periphery of cam 70 is such as to cause arm 68 to rock on shaft 42 in a manner and at a time to effect reciprocation of rod 67 and bodily oscillation of the rear flip bar 36 transversely of the axis of the latter when a tray is on tracks 25 and just before the tray is dropped from said tracks, thereby throwing the trailing margin of said burlap over the material on the tray.

*The pulp feeder device*

The bottom of the pulp feeder trough 31 is generally semi-cylindrical in cross-sectional contour so that similarly shaped gate 32 will follow this contour (which is concentric with the axis of shaft 33) in swinging of said gate to and from a position closing the elongated discharge opening in the bottom of said trough.

The arms 32' are pivotally supported on said shaft 33 (Fig. 6), and which shaft extends through said trough and projects outwardly of the ends of the latter. Each of said arms 32' may be said to be generally in the form of a bell crank, with the gate 32 carried on the outer ends of one of the arms of each crank, and links 72 are pivotally connected at one of their ends to the outer ends of the other arms of said cranks. The opposite ends of links 72 are pivotally connected to one of the ends of a pair of arms 73, which latter arms are secured at their opposite ends to a shaft 74 which in turn is rotatably supported in bearings secured to posts 75 of the feed trough supporting frame. This latter frame is carried by the loader frame and supports the feed trough elevated above the path of travel of trays passing below the trough.

At one end of shaft 74 is secured an arm 76 projecting radially from said shaft. Pivotally secured to the outer end of this arm is a rod 77 that extends generally parallel with side frame member 6 to a point adjacent cam shaft 45 where it is pivotally secured to an arm 78 (Fig. 3) carried on shaft 42, which latter shaft also supports the arm 68 that actuates the side flipper bars 35.

This arm 78 is substantially identical to arm 68, and carries a cam follower 79 held in engagement with the peripheral cam surface of a cam 80 on shaft 45 by a coil spring 81 (Fig. 3).

The contour of the cam surface of cam 80 is such as to cause reciprocation of rod 77 upon rotation of shaft 45 in one direction at such a time as a cloth lined tray commences to pass below the feed trough. This movement of rod 77 is in a direction to open gate 32, and as soon as the trailing edge of the tray so passing below the trough about reaches the opening in said trough, the rod moves in an opposite direction to close the opening.

The shaft 33 that extends through the feed trough carries an enlarged, horizontally elongated, generally drum-shaped section 82 within said trough, which section carries rows of spaced pins 83, which rows extend longitudinally of the section and the pins of adjacent rows are arranged in staggered relation.

Shaft 33 is continuously rotated to insure a uniform feeding of pulp therefrom when gate 32 is open, and to prevent the pulp from packing, since trough 31 is continuously fed with pulp from a feed hopper (not shown) positioned over the trough.

The means for rotating shaft 33 comprises a sprocket 84 secured on said shaft supporting one end of an endless chain 85 (Fig. 7) that extends at its opposite end over a sprocket 86 (Fig. 3) secured on shaft 19. This latter shaft is the one that also carries the sprocket 51 that is driven by chain 53 that in turn passes over the sprocket 52 driven by motor 54.

Two pairs of guide sprockets 87 carried by the loader frame at spaced points along the latter are provided for supporting the runs of said chain 85 between sprockets 84, 86.

*Actuating means for track sections 25*

The track sections 25 are slidably supported below fixed strips 24' (Figs. 7, 10) for reciprocation angularly relative to their lengths. Each of said guide strips 24' carries a pair of cap screws 89 extending downwardly through slots 90 formed in said track sections. The slots in each section are parallel, but the slots in one section extend convergently from the ends thereof that are nearest the fixed tracks 24. The heads of the cap screws 89 engage the lower sides of the track sections 25 and support said sections co-planar with fixed tracks 24, while each screw carries a roller (Fig. 10) that is disposed in each slot 90.

Figure 10:
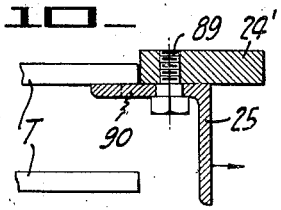
Fig. 10 is an enlarged sectional view of one of the movable track sections supporting a tray thereon before the section is moved from under the tray to permit dropping of the latter.

From the foregoing, it will be seen that if sections 25 are moved longitudinally in direction away from tracks 24, the sections will move toward each other, in which position the sections 25 will support a tray, as seen in Fig. 10. However, when sections 25 are moved toward tracks 24, the said sections will move away from each other and the tray will drop.

Below each track section 25, and secured thereto, is a pair of parallel, spaced walls 91 on opposite sides of shaft 65 that carries the arms supporting the rear flip bar 36. On shaft 65, and positioned between the opposed walls of each pair, is a cam 92 that is so formed and positioned as to cause reciprocation of tracks 25 for withdrawing them from below the tray thereon substantially simultaneously with actuation of the rear flipper bar 36. The same rod 67 and cam 70 on cam shaft 45 effects rotation of shaft 65 for moving the sections 25 as actuates the flipper bar 36.

*The mechanism for receiving loaded trays including actuating means therefor*

The device for receiving the trays dropped from sections 25, includes the hydraulically actuated piston 26 carrying the car 27 thereon.

Connected with the fluid containing cylinder 100 in which the piston is reciprocable, is a pipe 101 with which a pipe 102 is connected for supplying fluid under pressure to the cylinder. A hand controlled valve 103 is in pipe 102 for opening and closing the fluid supply to the cylinder 100.

In pipe 101 is a butterfly valve 104, which valve when opened will relieve the fluid pressure in the cylinder, provided valve 103 is closed.

After the car 27 is hoisted on piston 26 to a point slightly spaced below the level of sections 25 the valve 103 may be closed, and thereafter upon opening valve 104 the fluid will be released from cylinder 100 and the car will be lowered until valve 104 is again closed.

Figure 11:
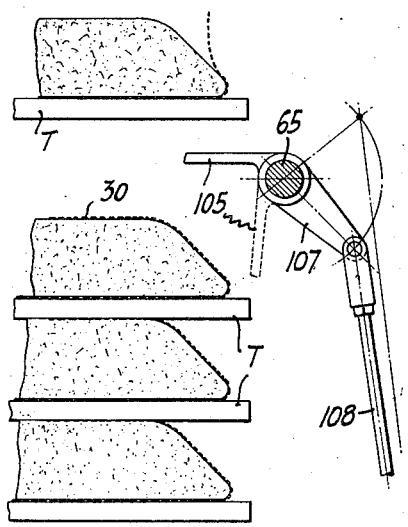
Fig. 11 is an enlarged, semi-diagrammatic elevational view of the tripping means for lowering the stack-supporting device that receives trays from the movable track sections.

In dropping from track sections 25 one edge of the tray will strike one horizontally disposed arm 105 of a crank-like element rotatably supported on the shaft 65 (Fig. 11), the other arm 107 of which projects from the opposite side of shaft 65. This arm 105 is in the form of a relatively short, flat plate disposed in the path of travel of the tray dropping from track sections 25 when the latter are moved from below the tray. A rod 108 is pivotally connected at one of its ends with the outer end of arm 107 and extends to valve 104 (Fig. 1) where it is pivotally connected to the arm 109 of the valve 104.

As the falling tray swings arm 105 downwardly, the valve 104 is opened, releasing the pressure in cylinder 100, and the car with the fallen tray is lowered the thickness of the tray and its load, since the tray clears the arm 105 after the latter has been rocked the necessary degree to open valve 104 a sufficient time to permit the lowering of piston 26 a distance equal to said thickness. The weight of connecting rod 108 is sufficient to effect closing of valve 104 by gravity after the tray clears arm 105. This intermittent lowering of the trays on the car 27, including the car, continues until the car is fully loaded, when the load is moved to the press and the piston with an empty car thereon is again elevated to the proper level for receiving another load.

*Water feed to olive pulp in feed device*

It is desirable to supply a predetermined quantity of water to the pulp as it is loaded on the trays, and to accomplish this result a pipe 110 for water (Fig. 6) is provided at the feed trough 31, which pipe extends through the trough and is perforated within the trough for discharge of water into the pulp in the latter for the length of the trough. Outside one end of said trough is a valve 111 in said pipe, which valve carries an actuating arm 112 for turning the valve on and off. A link 113 pivotally connects one end of said arm with one of the gate arms 32' at the point where one of the links 72 connects with said gate arm. When the gate is swung to open position the valve 111 is opened and water is ejected into the pulp being discharged onto the tray below the feed trough. When the gate closes the valve is closed.

*Pulp feeder shown in Figs. 12 to 15, inclusive*

While the pulp feeder device hereinbefore described is satisfactory where the load carried therein is relatively light, the feeder device of Figs. 12 to 15 is preferable where a considerable load is supported in the feed hopper.

Where this device is employed, the pulp feeder hereinbefore described is substituted by a hopper 120, the base of which is an upwardly inclined slat conveyor generally designated 121 comprising a pair of parallel endless chains 122 carrying conventional Ewart chain attachments 123 which are outwardly projecting lugs on connecting links. Spaced slats 124 extend between the chains and are secured to the attachments. The chains carrying the slats extend generally longitudinally of the path of travel of the trays adapted to pass therebelow, with the elevated end of the conveyor at the end thereof nearest the oncoming trays that pass below the conveyor.

The slats are slidable over a base 125 (Fig. 13) that extends between the sides of the hopper and from end to end thereof. An outlet 126 (Fig. 12) at the elevated end of the conveyor passes the slats from inside the housing and the elevated edge of the base 125 is closely adjacent and over a rotary drum 127 (Figs. 12, 14) supported by sprockets 128 on a drive shaft 129. The end edges of drum 127 are closely adjacent the sides 130 of a housing 131 that extends from hopper 120 at said outlet 126, and which housing extends substantially half way around the drum as best seen in Fig. 13.

The chains 122 are disposed in slots 132 in base 125, the lower sides of which slots are covered by strips 133 extending longitudinally thereof so as to prevent passage of any pulp through the slots.

The teeth 134 of the sprockets 128 extend through the drum 127 to engage the chains 122 as best seen in Fig. 14.

The lower end of conveyor 121 extends through an opening in the end wall of the hopper 120 that is opposite outlet 126, and is supported on shaft 135 that carries chain engaging sprockets 136.

The drive for the conveyor may comprise a sprocket chain 137 extending at one end over a sprocket 138 that is on one end of shaft 129 and over a sprocket 139 on a driven shaft rotatable in a gear box 140, while a drive shaft 141 in said box carries a sprocket 142 over which chain 85 extends. This latter chain is the same one that drives the rotary device in the feeder of Fig. 6, while a suitable conventional gear arrangement (not shown) in box 140 is used to give the proper direction of travel and speed to chain 137 for intermittently moving the conveyor 121 for discharging pulp from over drum 127 onto an advancing tray therebelow as said tray moves past the drum. The gears in box 140 and the various sprockets are so arranged that the proper volume of pulp is discharged onto the tray as the latter progressively moves past the drum.

The aforesaid pulp feeder may be secured on the main frame of the loader in any suitable manner.

By the above arrangement it is manifest that a relatively heavy load of pulp may be supported on base 125 and will be carried from said base for discharge over drum 127 without difficulty.

It is, of course, obvious that a water spray may be used in connection with this feeder, the same as is employed for the previously described feeder.

The foregoing description is thought sufficiently complete to give a clear understanding of the invention, and to also clearly explain the manner of operation of the apparatus illustrated.

Having described our invention, we claim:

1. The method of loading trays with olive pulp for pressing that comprises the steps of supporting a plurality of said trays for movement along a straight horizontally extending path of travel; moving said trays along said path; lining each of said trays with a filter cloth at a point in said path; distributing a layer of loose olive pulp on the lining of each tray so lined while such tray is moving in said path; and successively dropping the loaded trays from said path one on top of the other at one end of said path thereby forming a stack of loaded trays for removal to a press for pressing the oil from the pulp on said trays.

2. The method of loading trays with olive pulp for pressing that comprises simultaneously moving upwardly a plurality of empty trays arranged in superposed relation; successively moving the uppermost of said empty trays generally horizontally along a path of travel as each of said trays reaches a predetermined level; loading said trays with a layer of olive pulp at a point in said path as said trays successively move past said point; and dropping the loaded trays from said path to superposed relation one on top of the other after said trays have passed said point thereby forming a vertical stack of loaded trays for removal to a press.

3. The method of loading trays with olive pulp for pressing that includes the step of moving a plurality of trays in co-planar relation and in a row along a generally horizontal path of travel; positioning a sheet of filter cloth on each of said trays so moved at a point intermediate the ends of said path; depositing a layer of olive pulp on the sheet of filter cloth supported on each tray immediately after each sheet is so positioned; folding the leading and trailing margins of said sheet over said layer during movement of the tray and sheet so loaded past said loading point; and thereafter folding the side margins of said sheet over said layer of olive pulp on said sheet and dropping each tray from said path substantially simultaneously with the said folding of the side margins over the load on each tray.

4. The method of loading trays with olive pulp for pressing that includes the steps of supporting empty horizontally disposed trays for generally horizontal movement; positioning a lining of filter cloth on each of such trays at a point in said path with the margins of such cloth projecting a substantial distance outwardly of the edges of each tray; moving each tray with its said lining of filter cloth below a supply of olive pulp and depositing a layer of such pulp on the lining on each tray inwardly of said projecting margins as each tray passes below the loader; folding the said margins of said cloth over the layer of pulp deposited inwardly of said margins; and stacking said loaded trays at one end of said path with the bottom of each succeeding tray supported on the folded margins and layer of the previously loaded tray.

5. The method as defined in claim 4 in which said stacking and the folding of two of the opposed margins of said cloth on successively loaded trays is substantially simultaneous.

6. A loader for loading olive pulp onto a tray lined with a filter cloth in which the marginal portions of such lining project outwardly of the edges of said tray, comprising; tray supporting means for supporting a horizontally disposed tray so lined for movement along a generally horizontal path of travel; tray moving means for moving such tray, including its lining, along said path; an olive-pulp feeder disposed over said path; feeder actuating means cooperatively associated with said tray-moving means for causing discharge of pulp from said feeder onto the tray lining in a layer as said tray is moved along said path below said feeder; and means engaging the said marginal portions of said lining connected with said feeder and with said tray-moving means arranged and adapted to automatically fold said portions over the corresponding marginal portions of the layer of pulp discharged from said feeder onto said lining.

7. A loader for loading olive pulp onto a tray supporting a filter cloth thereon in which the marginal portions of such cloth project outwardly of the edges of said tray, comprising; tray supporting means for supporting a horizontally disposed tray so supporting said cloth for movement along a generally horizontal path of travel; tray-moving means for moving said tray and cloth along said path; an olive pulp feeder disposed over said path for feeding pulp therefrom onto tray-supported filter cloth adapted to be moved on said tray-supporting means below said feeder;

elements positioned along opposite sides of said path for supporting the said marginal portions of said cloth projecting from the opposite side edges of said tray when said tray is moved below said feeder; and means supporting said elements for movement thereof including the said marginal portions of the filter cloth supported thereon, to positions over material deposited on said tray, for folding said marginal portions over said material.

9. A construction as defined in claim 7, plus an element for supporting the trailing marginal portion of said cloth projecting from the trailing edge of said tray during movement of said tray below said feeder; means supporting said element for movement to a position over the material deposited on said tray for folding the said trailing marginal portion of said cloth over said material; and means for so moving said element.

8. A construction as defined in claim 7, plus an means associated with said feeder and with said tray-moving means automatically operative by actuation of said tray-moving means for folding the leading and trailing margins of said filter cloth over material deposited on said tray by said feeder.

10. A loader for loading olive pulp onto a tray supporting a filter cloth thereon in which the marginal portions of such cloth project outwardly of the edges of said tray, comprising; tray-supporting members for supporting said tray horizontal at two of its opposite edges for movement of said tray relative thereto along a substantially horizontal path of travel; a pulp feeder having a discharge opening positioned over said path and a closure movably supported on said feeder for movement to and from a position closing said opening; cloth supporting elements alongside said tray-supporting members for supporting two opposite projecting marginal portions of said cloth; said tray-supporting members being movable to and from positions supporting a tray thereon and said cloth supporting elements being movable to and from positions overlying the adjacent marginal portions of a tray supported on said tray-supporting members; cooperatively associated actuating means respectively connected with said closure and with said tray-supporting members and with said elements and respectively actuatable to actuate said closure, said members and said elements in sequence for loading said tray with pulp, and for dropping the tray so loaded from said members, and for folding said opposite projecting marginal portions of said cloth over the material so loaded on said tray, said loading being effected by movement of said closure from over said opening to uncover the latter, and said dropping being effected by movement of said members away from tray-supporting position, and said folding being effected by movement of said elements to positions over the material loaded on said tray.

11. A loader for loading trays with olive pulp, comprising; tray-supporting means for supporting a plurality of trays substantially horizontal and in a row in edgewise relation for movement longitudinally of said row in a generally horizontal path of travel; said tray-supporting means including elements at a point along said path movable from tray supporting position to a position releasing a tray thereon for dropping by gravity; a pulp feeder adjacent said elements and over said path for discharging pulp onto said trays during movement of the latter in said path and onto said elements; means for actuating said feeder for so discharging pulp onto said trays during said movement of said trays; means for so moving said trays; vertically movable means below said elements for receiving loaded trays released from said elements; and means for actuating said vertically movable means for lowering the same a distance substantially the thickness of a tray and its load following release of a tray from said elements.

12. Apparatus of the character described, comprising in combination; a vertically disposed elevator, including tray-supporting members arranged and adapted to support a plurality of horizontally disposed trays in superposed relation for horizontal sliding of each of said trays horizontally to and from said members in one direction; a horizontally elongated tray carrier positioned adjacent the upper end of said elevator and extending laterally therefrom in said one direction; means intermittently actuating said elevator for successively elevating trays on said members to said carrier; tray-moving means engageable with the uppermost of said trays so successively elevated to said carrier and movable in said one direction for sliding each of such uppermost tray onto said carrier in engagement with the preceding tray so moved for moving such preceding tray along said carrier; a pulp loader over said carrier actuatable for discharging olive pulp onto each tray so moved on said carrier; means for so actuating said loader; and a stacker for loaded trays at the end of said carrier remote from said elevator actuatable for releasing trays for dropping by gravity one on the other after movement of said trays past said loader.

CHARLES LIVOTI.
GEORGE L. HURST.